US011611496B2

(12) United States Patent
Huang et al.

(10) Patent No.: US 11,611,496 B2
(45) Date of Patent: Mar. 21, 2023

(54) COMPOSITE KEY PERFORMANCE INDICATORS FOR NETWORK HEALTH MONITORING

(71) Applicant: Cisco Technology, Inc., San Jose, CA (US)

(72) Inventors: Scott Zhenlong Huang, San Jose, CA (US); Reda Haddad, San Jose, CA (US); Venkatabalakrishnan Krishnamurthy, Cupertino, CA (US); Selvakumaran N. Subramanian, Pleasanton, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/237,243

(22) Filed: Apr. 22, 2021

(65) Prior Publication Data

US 2021/0243097 A1 Aug. 5, 2021

Related U.S. Application Data

(63) Continuation of application No. 16/666,609, filed on Oct. 29, 2019, now Pat. No. 11,271,835.
(Continued)

(51) Int. Cl.
*H04L 43/04* (2022.01)
*H04L 41/069* (2022.01)
(Continued)

(52) U.S. Cl.
CPC ........ *H04L 43/0817* (2013.01); *H04L 41/069* (2013.01); *H04L 41/0654* (2013.01); *H04L 41/0681* (2013.01); *H04L 43/04* (2013.01)

(58) Field of Classification Search
CPC . H04L 43/0817; H04L 43/04; H04L 41/0654; H04L 41/0681; H04L 41/069
See application file for complete search history.

(56) References Cited

U.S. PATENT DOCUMENTS 7,752,301 B1   7/2010  Maiocco et al.
9,584,374 B2 *  2/2017  Bingham ............ H04L 41/0806
(Continued)

FOREIGN PATENT DOCUMENTS

WO          2017019018 A1      2/2017

OTHER PUBLICATIONS

"VMware vCloud Architecture Toolkit Cloud Bursting," VMware, Version 3.0, Sep. 2012, 23 pages.
(Continued)

*Primary Examiner* — S M A Rahman
(74) *Attorney, Agent, or Firm* — Edell, Shapiro & Finnan, LLC

(57) ABSTRACT

A remote server monitors the health of a network of computing devices through hierarchical composite indicators by obtaining performance attributes from computing devices in the network. The server generates a composite indicator associated with one or more of the computing device based on a combination of at least two performance attributes of the computing device(s). The server monitors the composite indicator and, responsive to a determination that the composite indicator indicates an alert condition, generates an alert associated with the computing device(s). Additionally, if the alert condition is subject to remediation, the server causes at least one of the computing devices to execute a command to provide remediation of the alert condition.

20 Claims, 8 Drawing Sheets

Related U.S. Application Data

(60) Provisional application No. 62/857,970, filed on Jun. 6, 2019, provisional application No. 62/846,107, filed on May 10, 2019.

(51) Int. Cl.
  *H04L 41/0681* (2022.01)
  *H04L 43/0817* (2022.01)
  *H04L 41/0654* (2022.01)

(56) References Cited

U.S. PATENT DOCUMENTS

| | | | |
|---|---|---|---|
| 9,715,380 | B2 | 7/2017 | Ramachandran et al. |
| 10,146,609 | B1 | 12/2018 | Leverich et al. |
| 2008/0021994 | A1 | 1/2008 | Grelewicz et al. |
| 2008/0140473 | A1 | 6/2008 | Taylor |
| 2010/0077077 | A1 | 3/2010 | Devitt |
| 2010/0149984 | A1 | 6/2010 | Kapoor et al. |
| 2010/0241903 | A1 | 9/2010 | Goldszmidt et al. |
| 2011/0173051 | A1* | 7/2011 | Dey ................ G06Q 30/02 705/7.39 |
| 2015/0046757 | A1 | 2/2015 | Brew et al. |
| 2015/0138988 | A1 | 5/2015 | Shaw |
| 2016/0066199 | A1* | 3/2016 | Yeddala ............ H04W 28/0289 370/252 |
| 2016/0149771 | A1 | 5/2016 | Prasad et al. |
| 2016/0216855 | A1 | 7/2016 | Choudhary et al. |
| 2016/0316485 | A1* | 10/2016 | Kumar ............... H04W 24/08 |
| 2017/0149604 | A1* | 5/2017 | Burford ............. H04L 41/0681 |
| 2017/0171231 | A1 | 6/2017 | Reybok, Jr. et al. |
| 2017/0201897 | A1 | 7/2017 | Yang et al. |
| 2017/0310546 | A1 | 10/2017 | Nair et al. |
| 2017/0317873 | A1 | 11/2017 | Hevizi et al. |
| 2018/0184307 | A1* | 6/2018 | Periyasamy ............ H04W 4/50 |
| 2018/0324063 | A1 | 11/2018 | Oliveira |
| 2019/0230543 | A1 | 7/2019 | Zackariya |
| 2020/0127903 | A1 | 4/2020 | Chintala et al. |
| 2020/0228430 | A1 | 7/2020 | Louca et al. |
| 2020/0235985 | A1* | 7/2020 | Embarmannar Vijayan ................ H04L 41/0672 |
| 2020/0319989 | A1 | 10/2020 | Marndi et al. |
| 2020/0351149 | A1 | 11/2020 | Yan et al. |

OTHER PUBLICATIONS

"VMware Smart Assurance K4M 1.0.0," VMware, Installation and Administration Guide, 2019, 33 pages.

"VMware Smart Assurance K4M 1.0.0," WMware, User Guide, 2019, 23 pages.

CISCO, "Visualize, Optimize, and Automate—Use Crosswork Optimization Engine to improve network operations," White Paper, May 2019, 3 pages.

Splunk, "Splunk MINT™ Management Console Splunk MINT Management Console User Guide 1.0," Oct. 2016, 3 pages.

Prometheus, "Prometheus Overview," retrieved from https://prometheus.io/docs/introduction/overview/, Oct. 2019, 4 pages.

Zenoss, "Triggers and notifications," Zenoss Cloud, Using Collection Zones, 2 pages, retrieved from Internet Mar. 25, 2021, https://help.zenoss.com/docs/using-collection-zones/triggers-and-notifications.

"Defining Recording Rules," Promertheus, https://prometheus.io/docs/prometheus/latest/configuration/recording_rules/, retrieved from the Internet Aug. 2, 2022, 5 pages.

* cited by examiner

COMPOSITE KEY PERFORMANCE INDICATORS FOR NETWORK HEALTH MONITORING

CROSS-REFERENCE TO RELATED APPLICATIONS

This application is a continuation of U.S. patent application Ser. No. 16/666,609, filed Oct. 29, 2019, which claims priority to U.S. Provisional Patent Application No. 62/846,107, filed May 10, 2019, and to U.S. Provisional Patent Application No. 62/857,970, filed Jun. 6, 2019, the entirety of which are all incorporated herein by reference.

TECHNICAL FIELD

The present disclosure relates to health monitoring of computing devices, and more specifically, to performing health monitoring of network devices using composite key performance indicators.

BACKGROUND

In the field of networking, telemetry data that is received from a network of computing devices can be used to monitor the health of the devices and the network as a whole. Rules can be developed and applied to telemetry data in order to detect anomalies in traffic or routing protocols. Often, operators may be required to monitor multiple operational states at once. However, manual monitoring of large volumes of data may not be possible as the number of devices increases.

Additionally, troubleshooting a production network may be challenging. In particular, operators may be required to perform manual operations on many individual devices in order to investigate control plane and data plane issues, and to evaluate and correlate findings to determine the causes of network failures. This process can be time-consuming and cost-ineffective, especially for larger networks.

DESCRIPTION OF EXAMPLE EMBODIMENTS

Overview

Figure 1:
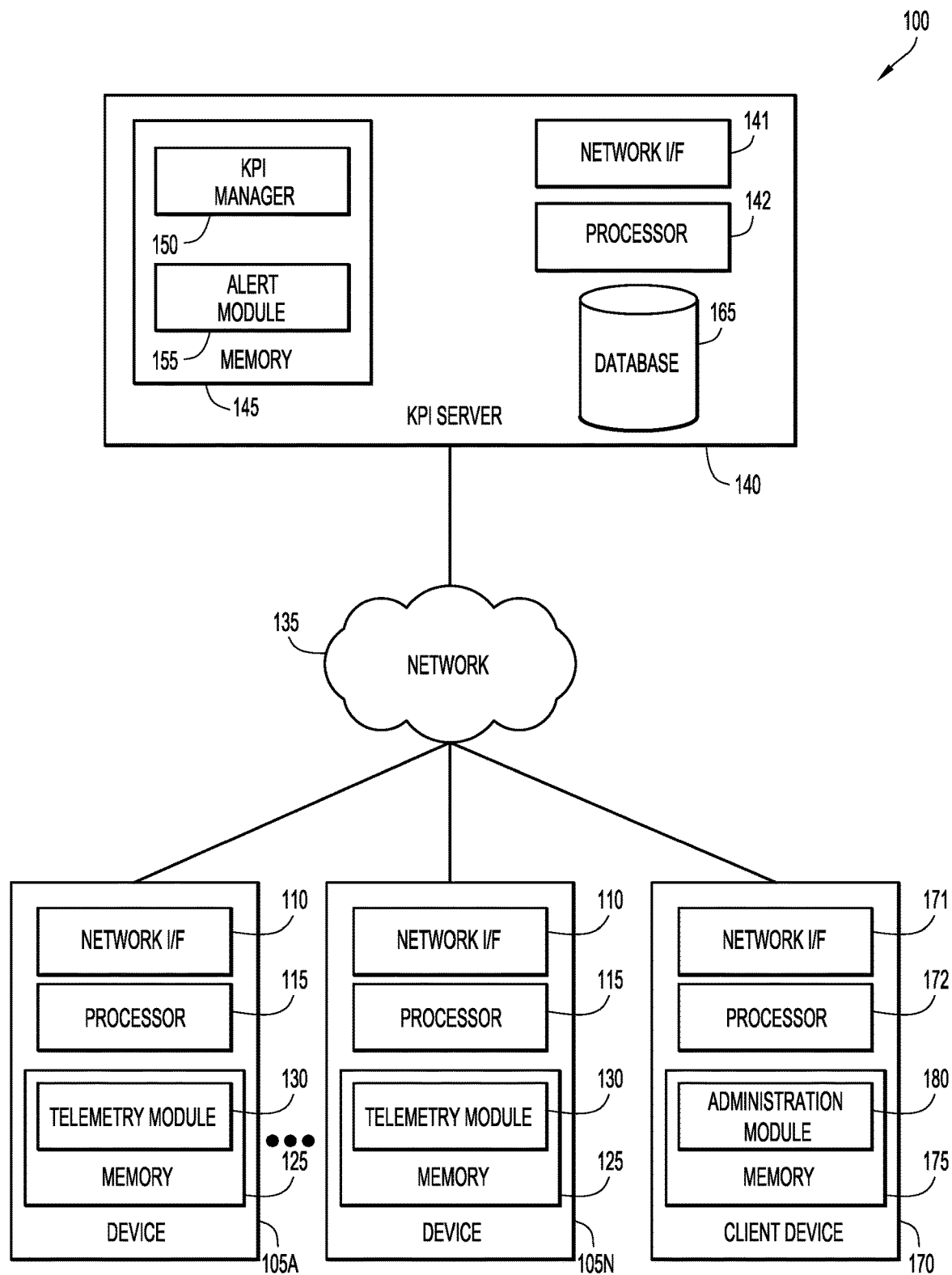
FIG. 1 is a block diagram depicting a network environment for health monitoring of a network of computing devices, in accordance with an example embodiment.

A computer-implemented method is presented for monitoring computing devices through composite KPIs. The method includes obtaining telemetry data from a computing device among a network of computing devices. The telemetry data includes a plurality of performance attributes of the computing device. The method also includes generating a composite indicator associated with the computing device. The composite indicator is defined by a combination of at least two performance attributes of the computing device. The method further includes monitoring the composite indicator and, responsive to a determination that the composite indicator meets an alert threshold, generating an alert associated with the computing device.

EXAMPLE EMBODIMENTS

The techniques presented herein provide a programmable framework for operators to define composite key performance indicators on-site for the purpose of monitoring the health of computing devices. Hereinafter, the example embodiments describe network devices, such as routers or switches, but the techniques presented herein are also applicable to other computing devices, such as desktop computers, laptop computers, servers, Internet of Things (IoT) devices, and the like. In general, the techniques presented herein may be applicable to any computing device that provides telemetry data that may collected at a remote server (e.g., in response to a query).

Using flexible Boolean logic, outputs from primitive key performance indicators such as performance attributes of the network devices can be combined, thereby adapting to the various monitoring needs of production networks. Alerts may be generated by automatically correlating rules to stock and/or custom key performance indicators. Output from composite key performance indicators may be delivered to user-specified entities, and can also be used as input parameters for remediation workflow engines.

Additionally, the techniques presented herein provide a hierarchical programmable system for operators to correlate alerts across multiple devices in production networks to determine network failures. Composite key performance indicators are employed to monitor the health of individual network devices, and flexible Boolean logic is used to correlate alerts generated from the composite key performance indicators on multiple computing devices. Operators may create composite key performance indicators and network health correlation logic via application programming interface calls to adapt to the various monitoring needs of production networks. User-specified entities may be notified of the outcomes of network health correlation logic, and anomaly remediation is supported with a feedback-driven workflow engine that passes outputs from the network health correlation logic.

The present disclosure relates to health monitoring of network devices, and more specifically, to performing health monitoring using composite key performance indicators (KPIs). Embodiments presented herein leverage multiple data sources to monitor the health of network devices and networks. Telemetry data that is received from network devices may conform to a Yet Another Next Generation (YANG) model. In the YANG model, data is stored in leaf nodes of a YANG tree; individual nodes can be described according to their YANG paths in the model. A KPI can be defined by specifying a YANG path to be monitored in order to infer useful information, such as the state of a device from which YANG messages are being received. Composite KPIs may refer to KPIs that are themselves based on two or more KPIs. By creating and monitoring composite KPIs, alerting and auto-remediation of network anomalies can be performed in an efficient manner that reduces the amount of computing resources required to monitor the health of network devices.

In another example, the present disclosure relates to correlation of composite KPIs to ensure the health of a network. A composite KPI refers to a KPI that is defined according to the output of two or more primitive KPIs. Operators may create composite KPIs and network health correlation logic via application programming interface (API) calls in order to satisfy the various monitoring needs in a production. Hierarchical programmability is achieved by providing logic gates that support Boolean operations on various inputs. In particular, logic gate arrays can be used to create composite KPIs, and to define network health correlations. Thus, single or multiple inputs may be supported. Multivariate composite KPIs can be created to monitor different network services on the same device, and different network health correlation logic can be programmed on the same set of network devices for different network services.

Embodiments presented herein may notify user-specified entities of the outcomes of network health, may capture transient failures that occur in networks, may analyze history and trends of networks, and may remediate network anomalies via closed-loop auto-remediation processes. Transient failures that would otherwise be undetectable during conventional manual troubleshooting can be captured, and time intervals for network health history and trends can be specified.

Embodiments are now described in detail with reference to the figures. FIG. 1 is a block diagram depicting a network environment 100 for configuring network devices and correlating composite key performance indicators, in accordance with an example embodiment. As depicted, network environment 100 includes a plurality of devices 105A-105N, a network 135, a KPI server 140, and a client device 170. It is to be understood that the functional division among components of network environment 100 have been chosen for purposes of explaining the embodiments and is not to be construed as a limiting example.

Each device 105A-105N includes a network interface (I/F) 110, a processor 115, and memory 125. The memory 125 stores software instructions for telemetry module 130, as well as various other data involved in operations performed by the processor 115. In various embodiments, devices 105A-105N may include any programmable electronic device capable of executing computer readable program instructions. Devices 105A—105N may thus include any network devices, such as devices that perform routing or other network functions. Each device 105A-105N may include internal and external hardware components, as depicted and described in further detail with respect to FIG. 8.

Telemetry module 130 may collect data relating to a device's health and performance and transmit the collected data to one or more network-accessible recipients, such as KPI server 140. Telemetry module 130 may collect data corresponding to any data type, format, or protocol, including telemetry data that follows a YANG model, telemetry data that correspond to a Simple Network Management Protocol (SNMP) protocol, a Command Line Interface (CLI) format, or any other format.

Network 135 may include a local area network (LAN), a wide area network (WAN) such as the Internet, or a combination thereof, and includes wired, wireless, or fiber optic connections. In general, network 135 can use any combination of connections and protocols that support communications between devices 105A-105N, KPI server 140, and/or client device 170 via their network interfaces 110, 141, and/or 171, respectively.

KPI server 140 includes a network interface (I/F) 141, a processor 142, memory 145, and a database 165. The memory 145 stores software instructions for a KPI manager 150 and an alert module 155, as well as various other data involved in operations performed by the processor 142. In various embodiments, KPI server 140 may include any programmable electronic device capable of executing computer readable program instructions. KPI server 140 may include internal and external hardware components, as depicted and described in further detail with respect to FIG. 8.

KPI manager 150 and alert module 155 may include one or more modules or units to perform various functions of the embodiments described below. KPI manager 150 and alert module 155 may be implemented by any combination of any quantity of software (and/or hardware modules or units), and may reside within memory 145 of KPI server 140 for execution by a processor, such as processor 142.

KPI manager 150 may enable an operator to add, remove, and edit KPIs, which can be used to collect and monitor telemetry data of devices 105A-105N. Collected data may follow a YANG model, or may be converted into a YANG model. For example, data in other formats, such as SNMP or CLI formats, may be converted to a YANG format. KPI manager 150 may enable an operator to configure composite KPIs and to correlate alerts from multiple devices to determine network failures.

An operator may provide instructions to KPI manager 150 via administration module 180 of client device 170 in order to manage KPIs. KPI manager 150 may provide a programmable framework for an operator to define KPIs by specifying YANG paths and alerting rules, and to define composite KPIs by linking KPIs using Boolean logic. For example, KPI manager 150 may link two KPIs with an AND operator so that both KPIs must trigger an alert in order for the composite KPI to trigger an alert. KPI manager 150 may composite KPI histories and trends on different network devices. In some embodiments, any telemetry data that does not correspond to a YANG data model may be converted data that follows a YANG data model by KPI manager 150.

KPI manager 150 may manage an extensible library of primitive and composite KPIs that can be reused for same or other network deployments. KPIs created by domain experts, customers, customer experience teams, and the like, can be added to a shared KPI library for reuse on one or more network devices. Thus, KPI manager 150 enables any stock or customized KPI, including composite KPIs, to be reused to monitor health of production networks. For example, KPIs in a KPI library may be reused on other network devices that have similar characteristics and features. For example, some products may support the same YANG modules and/or may have similar configuration features to a device that is supported by the KPI library.

Alert module 155 may issue alerts that are triggered by primitive and/or composite KPIs configured using KPI manager 150. Alert module 155 may monitor telemetry data received from devices 105A-105N according to the logic provided by KPI manager 150 in order to detect violations. Alerts may be provided to a user device, such as client device 170, and may be presented in a user interface. Alerts may be reported in graphs, heatmaps, charts, tables, and the like. In some embodiments, alert module may store raw data and alerts in a time series database. Alert module 155 may retrieve data from the time series database to display frequent alerts, perform live monitoring, review historical data, and the like. In some embodiments, alert module 155 may provide notifications for composite KPI outcomes by pushing events to user-specified or other entities. Severity levels may be established for alerts based on KPI values passing predefined or other thresholds, such as a KPI having a value that exceeds a standard deviation from the mean, etc. Alert module 155 may perform polling via Application Programming Interface (API) calls. Thus, alert module 155 may remediate anomalies using a feedback-driven remediation workflow engine by passing parameters from a composite KPI to playbooks.

In some embodiments, alerts are linked to playbooks containing commands that can be executed on remote devices (e.g., devices 105A-105N) to provide auto-remediation. KPI alert outputs can be mapped to inputs of playbooks that comprise remediation procedures. Playbooks may be tied to particular KPIs so that when an alert is triggered, a corresponding playbook may be executed. Thus, alert module 155 may provide logic to link any user-defined or standard primitive or composite KPI rules to any user-defined or standard playbook. KPI alerts may be linked to different playbooks in different deployments, thereby enabling flexible, fully-customizable mapping of alert parameters to remediation operations.

Database 165 may include any non-volatile storage media known in the art. For example, database 165 can be implemented with a tape library, optical library, one or more independent hard disk drives, or multiple hard disk drives in a redundant array of independent disks (RAID). Similarly, data in database 165 may conform to any suitable storage architecture known in the art, such as a file, a relational database, an object-oriented database, and/or one or more tables. Database 165 may store data such as stock or custom KPIs, identifiers and network paths of devices 105A-105N registered with KPI server 140, historical telemetry data (e.g., time series data), and the like.

Client device 170 includes a network interface 171, at least one processor 172, and memory 175 with an administration module 180. In various embodiments, client device 170 may include any programmable electronic device capable of executing computer readable program instructions. Network interface 171 may include one or more network interface cards that enable components of client device 170 to send and receive data over a network, such as network 135. Client device 170 may include internal and external hardware components, as depicted and described in further detail with respect to FIG. 6.

Administration module 180 may enable a user of client device 170, such as network operator, to provide input to KPI manager 150 and/or alert module 155 to manage network monitoring, updating, maintenance, and/or remediation tasks. In particular, administration module 180 may enable a user to define primitive and composite KPIs and network health correlation logic. A user may also specify entities that should be notified of the outcomes of network health correlation logic monitoring. A user of client device 170 may manage configurations and devices using a user interface, such as the user interface that is depicted and described in further detail below with respect to FIG. 4.

Figure 2:
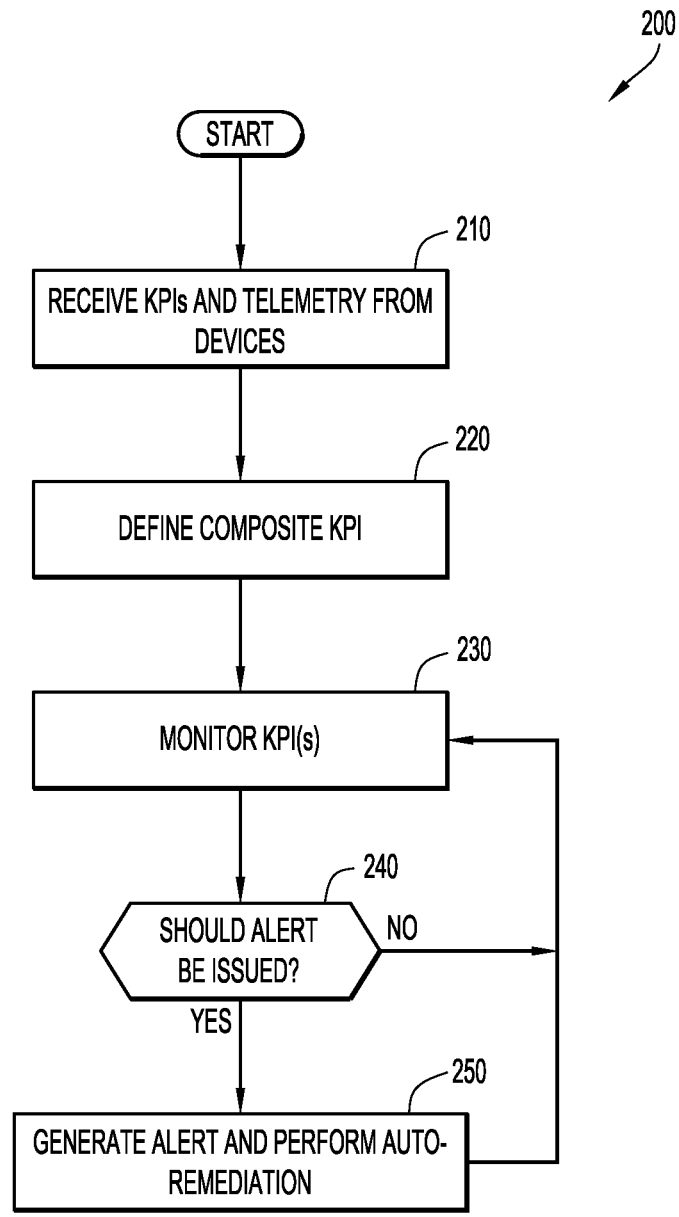
FIG. 2 is a flow chart depicting a method of monitoring computing devices, in accordance with an example embodiment.

Reference is now made to FIG. 2. FIG. 2 is a flow chart depicting a method 200 of monitoring computing devices, in accordance with an example embodiment. KPIs and telemetry data from devices are received at operation 210. KPIs may be selected from a KPI library or defined (e.g., by providing one or more YANG paths for monitoring) using KPI manager 150. Telemetry data may be received from one or more devices, such as devices 105A-105N.

In one example, telemetry data may be a binary metric that is either TRUE or FALSE, such as whether an interface is active or inactive, which may be used directly as a KPI. Alternatively, telemetry data may be a numerical value, such as Central Processing Unit (CPU) Utilization, which may be compared to a predetermined threshold to obtain a binary KPI based on the numerical value of the telemetry data. Further, multiple KPIs may be based on the same telemetry data by comparing the telemetry data to different predetermined thresholds. For instance, CPU Utilization of 70% may trigger one KPI, while CPU Utilization of 98% may trigger a separate KPI that may signal a more critical condition.

A composite KPI is defined at operation 220. A composite KPI may be defined by combining KPI alerts from other KPIs using Boolean operators, such as AND, OR, NOT, and the like. When two or more KPIs are joined to create a composite KPI, the composite KPI may issue an alert based on the conditions of the underlying KPIs.

KPIs are monitored at operation 230. Alert module 155 may monitor one or more primitive or composite KPIs in order to determine whether an alert should be issued. Operation 240 determines whether an alert should be issued. An alert is issued for a composite KPI when the underlying KPIs satisfy the Boolean logic of the composite KPI. For example, if two KPIs are joined using an AND operator, both KPIs must be triggered to alert an issue for a composite KPI, whereas if two KPIs are joined using an OR operator, either KPI may trigger an alert for the composite KPI.

An alert is generated and auto-remediation is performed at operation 250. The alert may be issued by alert module 155 and transmitted to one or more specified entities, including client device 170. Moreover, alert module 155 may execute one or more playbooks linked to the alerts to perform auto-remediation of computing devices, such as devices 105A-105N, that are associated with the alert.

Figure 3:
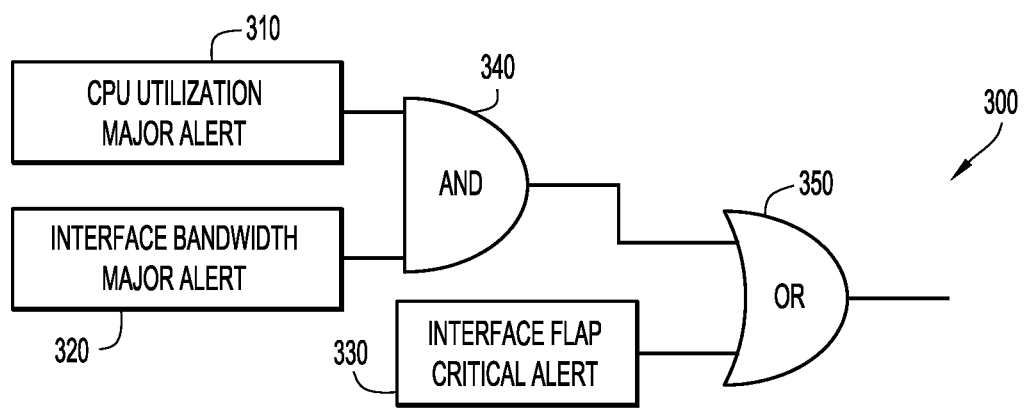
FIG. 3 is a logic diagram depicting a programmable alert logic, in accordance with an example embodiment.

Reference is now made to FIG. 3. FIG. 3 is a logic diagram 300 depicting a programmable alert logic, in accordance with an example embodiment. As depicted, logic diagram 300 shows that two primitive KPI alerts, "CPU UTILIZATION MAJOR ALERT" 310 and "INTERFACE BANDWIDTH MAJOR ALERT" 320, have been linked using an AND operator 340 to form a composite alert. This composite alert 340 has also been linked using an OR operator 350 to a third primitive KPI alert, "INTERFACE FLAP CRITICAL ALERT" 330. Thus, logic diagram 300 depicts a composite alert that will be triggered when the conditions for both alerts 310 and 320 have been satisfied, or if the condition for alert 330 has been satisfied.

The logic diagram 300 shows two logic gates (i.e., an AND gate and an OR gate) with two inputs as an example of Boolean logic that may be used to define a composite KPI. However, other configurations of logic elements may be used to define a composite KPI, such as logic elements with multiple inputs and/or cascading a composite KPI into one or more additional logic elements with additional primitive or composite KPIs.

Figure 4:
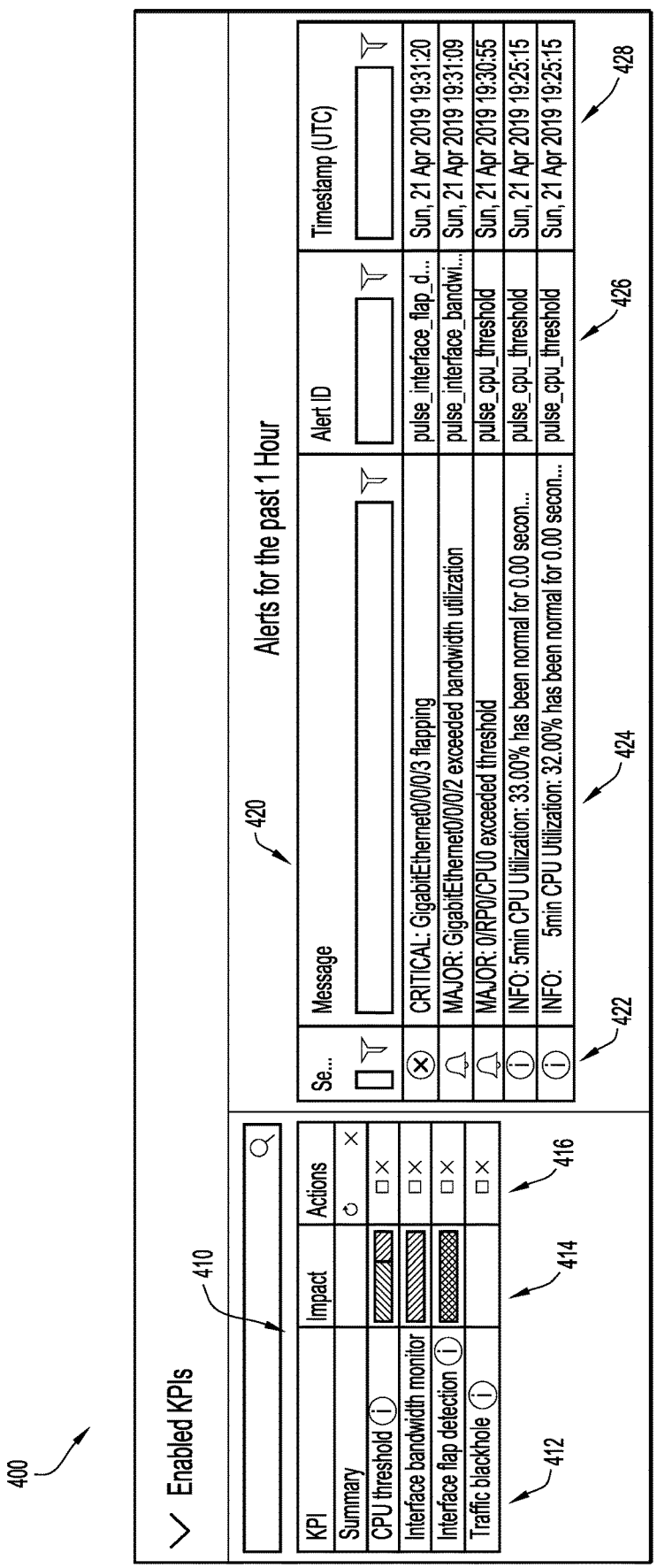
FIG. 4 is a diagram depicting a user interface for managing alert outputs, in accordance with an example embodiment.

Reference is now made to FIG. 4. FIG. 4 is a diagram depicting a user interface 400 for managing alert outputs, in accordance with an example embodiment. As depicted, user interface 400 shows a list 410 of enabled KPIs for a network and a list 420 of alerts that have been issued in the past hour. Each KPI in the list 410 includes a KPI name 412, an indication 414 of the impact that the KPI has on the network device, and a button 416 to define actions to take in response to the KPI. Each alert in the list 420 includes an icon 422 to indicate the severity of the alert, a message 424 to provide information on the nature of the alert, an alert identifier 426 and a timestamp 428. Each alert may be based on a primitive KPI or a composite KPI.

In one example of a composite KPI, an alert gate JavaScript Object Notation (JSON) may be defined with alerts for primitive KPIs, e.g., "pulse_cpu_threshold" and "pulse_interface_bandwidth_utilization," joined via an AND operator. In turn, these two alerts may be joined to an alert for another primitive KPI, e.g., "pulse_interface_flap_detector," via an OR operator.

Figure 5:
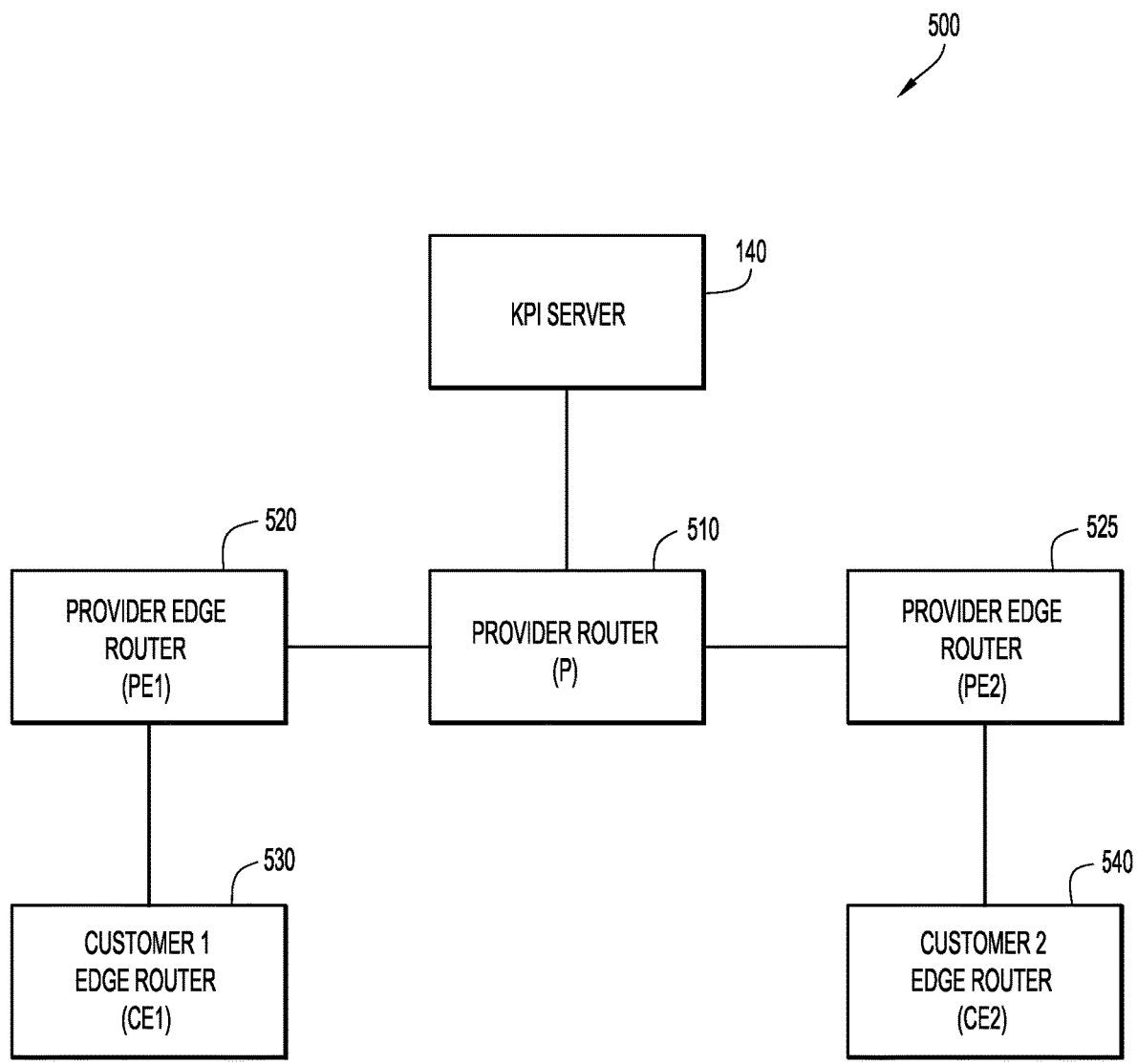
FIG. 5 is a block diagram depicting a network environment for a production network, in accordance with an example embodiment.

Referring now to FIG. 5, a block diagram depicting a network environment 500 for a production network is shown according to an example embodiment. As depicted, network environment includes a provider (P) router 510, a Provider Edge (PE1) router 520, a Provider Edge (PE2) router 525, a Customer Edge (CE1) router 530, and a Customer Edge (CE2) router 540. The KPI server 140 is also included in the network environment 500. The KPI server 140 is configured to gather telemetry data, primitive KPIs, and/or composite KPIs from a plurality of routers, such as the provider router 510 and provider edge routers 520 and 525, to generate a correlated KPI indicative of the health of the entire network environment 500.

Figure 6:
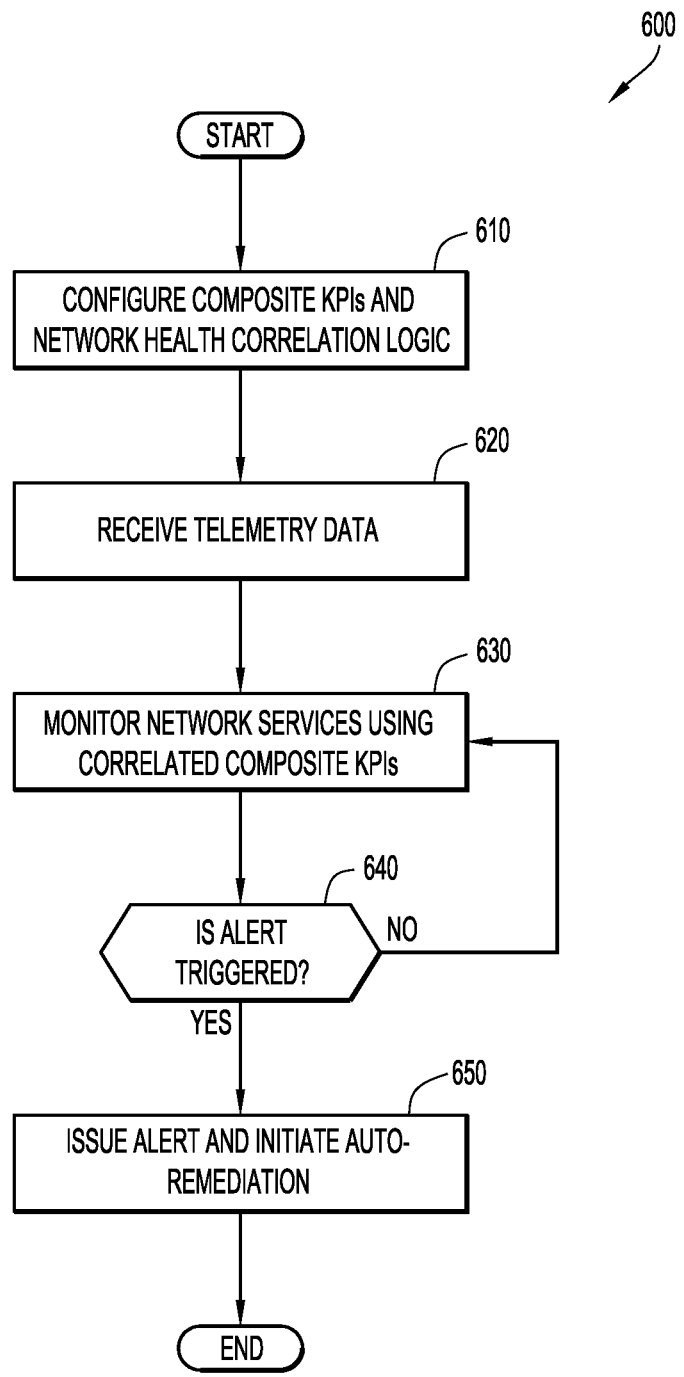
FIG. 6 is a flow chart depicting a method of monitoring a network, in accordance with an example embodiment.

Reference is now made to FIG. 6. FIG. 6 is a flow chart depicting a method 600 of monitoring performance of a network environment, such as network environment 500 shown in FIG. 5, in accordance with an example embodiment. The KPI server configures composite KPIs and network health correlation logic at operation 610. An operator may define composite KPIs based on two or more primitive KPIs, and may link composite KPIs together using Boolean logic to create network health correlations. For example, two KPIs can be correlated via an OR operator so that an alert is triggered based on either KPI.

Telemetry data is received at operation 620. Telemetry data may be received by KPI server 140 from devices 105A-105N shown in FIG. 1, and may adhere to a YANG model. Network services are monitored using the correlated composite KPIs at operation 630. The telemetry data may be compared to logic that is defined by an operator to detect violations that indicate whether an alert should be triggered.

Operation 640 determines whether an alert has been triggered. If an alert is triggered, the alert is issued and auto-remediation is initiated at operation 650. Otherwise, method 600 continues to monitor received telemetry data at operation 630.

Figure 7A:
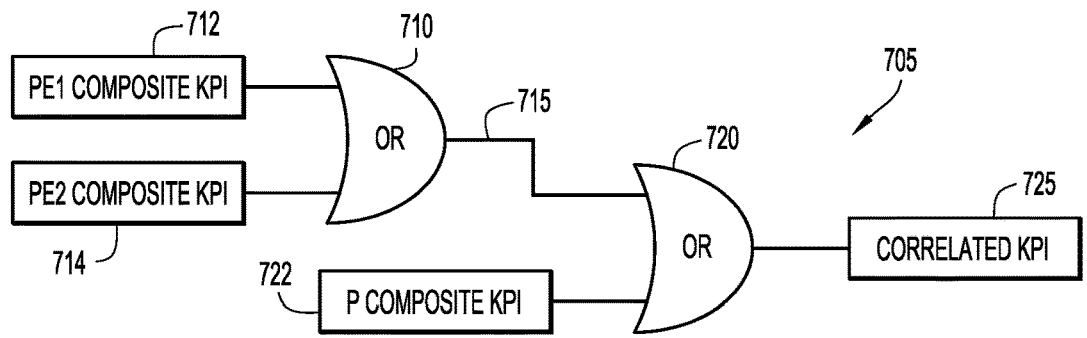
FIGS. 7A-7C are block diagrams depicting correlation logic, in accordance with example embodiments.
Figure 7B:
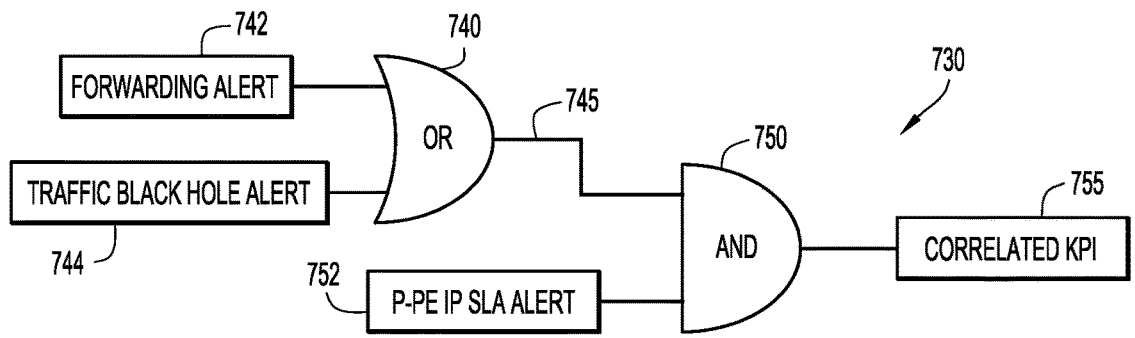
Figure 7C:
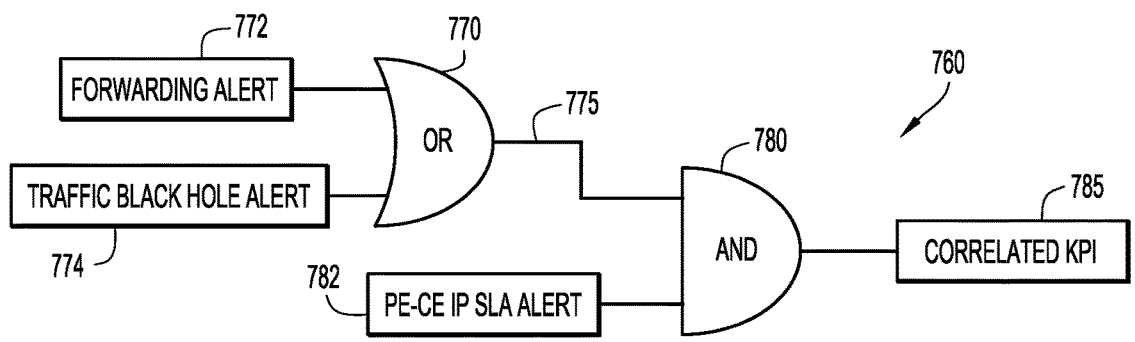

FIGS. 7A-7C are block diagrams depicting correlation logic, in accordance with example embodiments with reference to the network environment 500 shown in FIG. 5. FIG. 7A depicts logic 705 that correlates network health across multiple routers. Composite KPIs 712 and 714 for provider edge devices PE1 and PE2, respectively, are joined with an OR operator 710 to generate an intermediate output 715. Intermediate output 715 is then joined with a composite KPI 722 of another device, provider router P, with another OR operator 720 to generate the correlated KPI 725.

FIG. 7B depicts logic 730 in which a forwarding alert 742 and traffic black hole alert 744 are linked with an OR operator 740 to generate an intermediate output 745. Intermediate output 745 is then joined to a service level agreement (SLA) alert 752 for a provider-provider edge (Internet Protocol) IP SLA via an AND operator 750 to generate the correlated KPI 755. Thus, logic 730 triggers the correlated KPI 755 when the condition for the SLA alert 752 is satisfied and either (or both of) the forwarding alert condition 742 or the traffic black hole alert condition 744 is satisfied.

FIG. 7C depicts logic 760 that includes composite KPIs for a provider edge router. A forwarding alert 772 and a traffic black hole alert 774 are correlated with an OR operator 770 to generate an intermediate output 775. The intermediate output 775 is joined to a provider edge-customer edge IP service level agreement alert 782 via an AND operator 780 to generate the correlated KPI 785.

The logic 705, 730, and 760 depicted in FIG. 7A, FIG. 7B, and FIG. 7C, respectively, each shows two logic gates (e.g., an AND gate with an OR gate) with two inputs as examples of Boolean logic that may be used to define a correlated KPI. However, other configurations of logic elements may be used to define a correlated KPI, such as logic elements with multiple inputs and/or cascading a correlated KPI into one or more additional logic elements with additional primitive, composite, or correlated KPIs.

Figure 8:
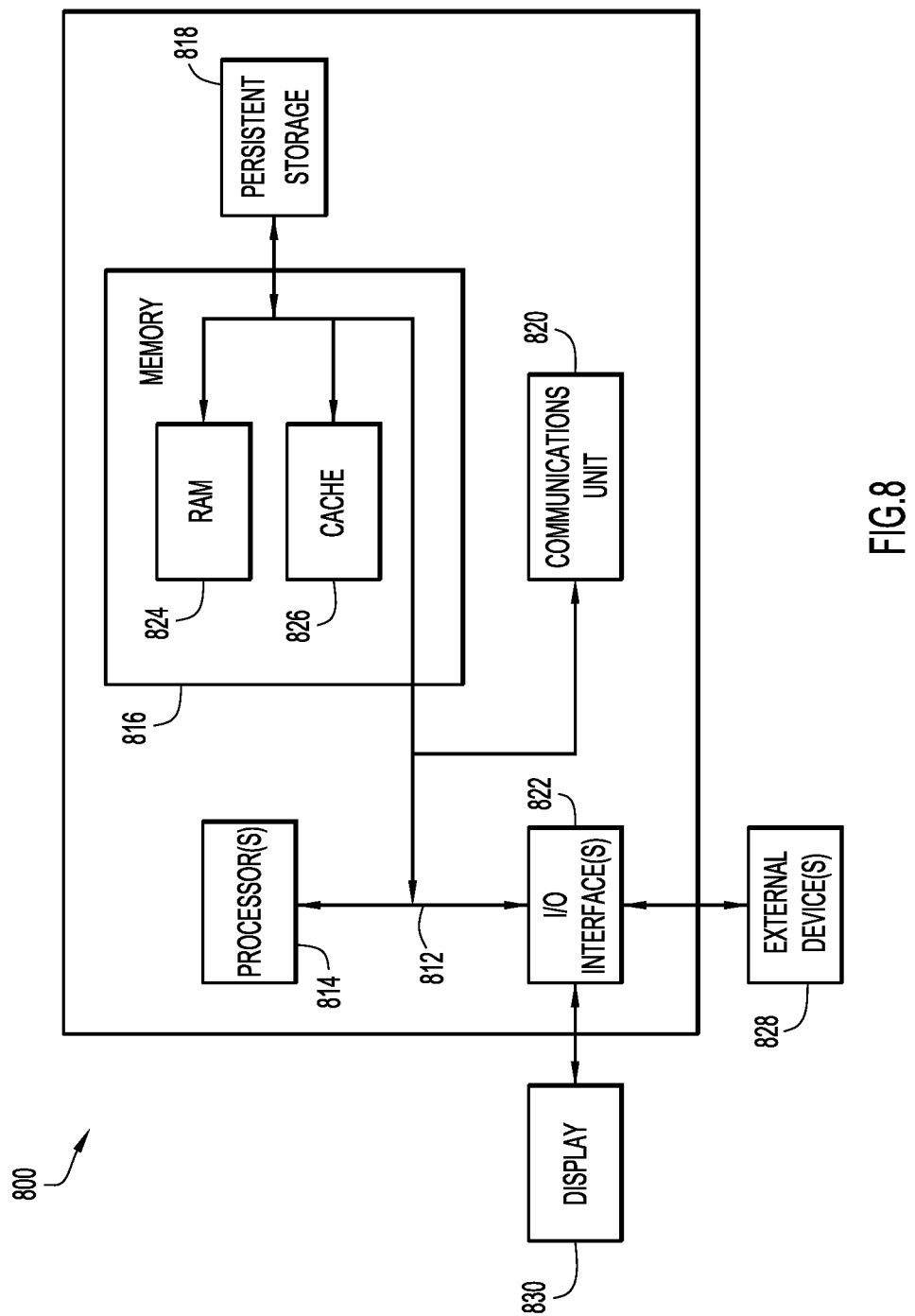
FIG. 8 is a block diagram depicting a computing device configured to perform the methods presented herein, in accordance with an example embodiment.

Reference is now made to FIG. 8. FIG. 8 is a block diagram depicting components of a computer 800 suitable for executing the methods disclosed herein. Computer 800 may implement devices 105A-105N, KPI server 140, and/or client device 170 in accordance with embodiments presented herein. It should be appreciated that FIG. 8 provides only an illustration of one embodiment and does not imply any limitations with regard to the environments in which different embodiments may be implemented. Many modifications to the depicted environment may be made.

As depicted, the computer 800 includes communications fabric 812, which provides communications between computer processor(s) 814, memory 816, persistent storage 818, communications unit 820, and input/output (I/O) interface(s) 822. Communications fabric 812 can be implemented with any architecture designed for passing data and/or control information between processors (such as microprocessors, communications and network processors, etc.), system memory, peripheral devices, and any other hardware components within a system. For example, communications fabric 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. The memory 816 may store the software instructions for telemetry module 130, KPI manager 150, alert module 155, and/or administration module 180 in performing the operations described herein.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to computer 800. For example, I/O interface 822 may provide a connection to external devices 828 such as a keyboard, keypad, a touch screen, and/or some other suitable input device. External devices 828 can also include portable computer readable storage media such as, for example, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to correlating composite key performance indicators and/or performing health monitoring using composite key performance indicators (e.g., device information, telemetry data, primitive and composite KPIs, alerts, etc.) may be stored within any conventional or other data structures (e.g., files, arrays, lists, stacks, queues, records, etc.) and may be stored in any desired storage unit (e.g., database, data or other repositories, queue, etc.). The data transmitted between devices 105A-105N, KPI server 140, and/or client device 170 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to correlating composite key performance indicators and/or performing health monitoring using composite key performance indicators (e.g., device information, telemetry data, primitive and composite KPIs, alerts, etc.) may include any information provided to, or generated by, devices 105A-105N, KPI server 140, and/or client device 170. Data relating to performing health monitoring using composite key performance indicators may include any desired format and arrangement, and may include any quantity of any types of fields of any size to store any desired data. The data relating to performing health monitoring using composite key performance indicators may include any data collected about entities by any collection means, any combination of collected information, and any information derived from analyzing collected information.

The present embodiments may employ any number of any type of user interface (e.g., representational state transfer (REST) application programming interfaces (API), Graphical User Interface (GUI), command-line, prompt, etc.) for obtaining or providing information (e.g., data relating to performing health monitoring using composite key performance indicators) where the interface may include any information arranged in any fashion. The interface may include any number of any types of input or actuation mechanisms (e.g., REST APIs, buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of performing health monitoring using composite key performance indicators.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., networking software, server software, telemetry module 130, KPI manager 150, alert module 155, administration module 180, etc.). These systems may include any types of monitors and input devices (e.g., keyboard, mouse, voice recognition, etc.) to enter and/or view information.

It is to be understood that the software (e.g., networking software, server software, telemetry module 130, KPI manager 150, alert module 155, administration module 180, etc.) of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments (e.g., networking software, server software, telemetry module 130, KPI manager 150, alert module 155, administration module 180, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the presented embodiments.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to performing health monitoring using composite key performance indicators). The database system may be implemented by any number of any conventional or other databases, data stores or storage structures (e.g., files, databases, data structures, data or other repositories, etc.) to store information (e.g., data relating to performing health monitoring using composite key performance indicators). The database system may be included within or coupled to the server and/or client systems. The database systems and/or storage structures may be remote from or local to the computer or other processing systems, and may store any desired data (e.g., data relating to performing health monitoring using composite key performance indicators).

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the present embodiments in the form disclosed. Many modifications and variations will be apparent to those of ordinary skill in the art without departing from the scope and spirit of the presented embodiments. The embodiment was chosen and described in order to best explain the principles of the presented embodiments and the practical application, and to enable others of ordinary skill in the art to understand various embodiments with various modifications as are suited to the particular use contemplated.

The descriptions of the various embodiments of the present embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of the presented embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, RAM, ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present embodiments are described herein with reference to flowchart illustrations and/or block diagrams of methods, apparatus (systems), and computer program products according to presented embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various presented embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one form, the techniques presented herein provide for a computer-implemented method of monitoring computing devices through composite KPIs. The method includes obtaining telemetry data from a computing device among a network of computing devices in a network. The telemetry data includes a plurality of performance attributes of the computing device. The method also includes generating a composite indicator associated with the computing device. The composite indicator is defined by a combination of at least two performance attributes of the computing device. The method further includes monitoring the composite indicator and, responsive to a determination that the composite indicator meets an alert threshold, generating an alert associated with the computing device.

In another form, an apparatus comprising a network interface and a processor is configured to monitor computing devices through composite KPIs. The network interface is configured to communicate with a network of computing devices. The processor is configured to obtain telemetry data from a computing device among the network of computing devices. The telemetry data includes a plurality of performance attributes of the computing device. The processor is also configured to generate a composite indicator associated with the computing device. The composite indicator is defined by a combination of at least two performance attributes of the computing device. The processor is further configured to monitor the composite indicator and, responsive to a determination that the composite indicator meets an alert threshold, generate an alert associated with the computing device.

In a further form, one or more non-transitory computer readable storage media are encoded with software comprising executable instructions. When the software is executed the instructions are operable to cause a processor to obtain telemetry data from a computing device among a network of computing devices. The telemetry data includes a plurality of performance attributes of the computing device. The instructions are also operable to cause the processor to generate a composite indicator associated with the computing device. The composite indicator is defined by a combination of at least two performance attributes of the computing device. The instructions are further operable to cause the processor to monitor the composite indicator and, responsive to a determination that the composite indicator meets an alert threshold, generate an alert associated with the computing device.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for monitoring a health of a network of computing devices, the method comprising:
   obtaining a plurality of performance attributes from a plurality of computing devices in the network of computing devices;
   generating a plurality of composite indicators, wherein at least one composite indicator of the plurality of composite indicators is defined by a Boolean combination of at least two performance attributes of the plurality of computing devices, the at least two performance attributes obtained from at least two computing devices among the plurality of computing devices;
   monitoring the plurality of composite indicators;
   responsive to a determination that the plurality of composite indicators indicate an alert condition, generating an alert associated with a computing device in the network of computing devices;
determining if the alert condition is subject to remediation; and
responsive to a determination that the alert condition is subject to remediation, causing the computing device to execute at least one command to provide remediation of the alert condition.

2. The method of claim 1, wherein the plurality of performance attributes comprises a plurality of metrics associated with the network of computing devices.

3. The method of claim 1, wherein one of the plurality of performance attributes comprises Central Processing Unit (CPU) utilization.

4. The method of claim 1, wherein the alert condition indicates a metric has exceeded a predetermined threshold.

5. The method of claim 1, wherein determining if the alert condition is subject to remediation comprises:
determining if the alert condition is subject to automatic remediation; and
responsive to a determination that the alert condition is subject to automatic remediation, causing the computing device to execute the at least one command to provide automatic remediation of the alert condition.

6. An apparatus comprising:
a network interface configured to communicate with a network of computing devices; and
a processor configured to:
obtain via the network interface, a plurality of performance attributes from a plurality of computing devices in the network of computing devices;
generate a plurality of composite indicators, wherein at least one composite indicator of the plurality of composite indicators is defined by a Boolean combination of at least two performance attributes of the plurality of performance attributes of the plurality of computing devices, the at least two performance attributes obtained from at least two computing devices among the plurality of computing devices;
monitor the plurality of composite indicators;
responsive to a determination that the plurality of composite indicators indicate an alert condition, generate an alert associated with a computing device in the network of computing devices;
determine if the alert condition is subject to remediation; and
responsive to a determination that the alert condition is subject to remediation, cause the computing device to execute at least one command to provide remediation of the alert condition.

7. The apparatus of claim 6, wherein the plurality of performance attributes comprises a plurality of metrics associated with the network of computing devices.

8. The apparatus of claim 6, wherein one of the plurality of performance attributes comprises Central Processing Unit (CPU) utilization.

9. The apparatus of claim 6, wherein the alert condition indicates a metric has exceeded a predetermined threshold.

10. A method for monitoring a health of a network of computing devices, the method comprising:
obtaining a plurality of performance attributes from a plurality of computing devices in the network of computing devices;
generating at least one composite indicator associated with at least two associated computing devices of the plurality of computing devices and defined by a Boolean combination of at least two performance attributes of the at least two associated computing devices, each of the at least two performance attributes obtained from a separate computing device among the at least two associated computing devices;
monitoring the at least one composite indicator;
responsive to a determination that the at least one composite indicator indicates an alert condition, generating an alert associated with the at least two associated computing devices;
determining if the alert condition is subject to remediation; and
responsive to a determination that the alert condition is subject to remediation, causing at least one of the at least two associated computing devices to execute at least one command to provide remediation of the alert condition.

11. The method of claim 10, wherein the plurality of performance attributes comprises a plurality of metrics associated with the network of computing devices.

12. The method of claim 10, wherein one of the plurality of performance attributes comprises Central Processing Unit (CPU) utilization.

13. The method of claim 10, wherein the alert condition indicates that a metric has exceeded a predetermined threshold.

14. The method of claim 10, wherein determining if the alert condition is subject to remediation comprises:
determining if the alert condition is subject to automatic remediation; and
responsive to a determination that the alert condition is subject to automatic remediation, causing at least one of the at least two associated computing devices to execute the at least one command to provide automatic remediation of the alert condition.

15. An apparatus comprising:
a network interface configured to communicate with a network of computing devices; and
a processor configured to:
obtain via the network interface, a plurality of performance attributes from a plurality of computing devices in the network of computing devices;
generate at least one composite indicator associated with at least two associated computing devices of the plurality of computing devices and defined by a Boolean combination of at least two performance attributes of the at least two associated computing devices, each of the at least two performance attributes obtained from a separate computing device among the at least two associated computing devices;
monitor the at least one composite indicator;
responsive to a determination that the at least one composite indicator indicates an alert condition, generate an alert associated with the at least two associated computing devices;
determine if the alert condition is subject to remediation; and
responsive to a determination that the alert condition is subject to remediation, cause at least one of the at least two associated computing devices to execute at least one command to provide remediation of the alert condition.

16. The apparatus of claim 15, wherein the plurality of performance attributes comprises a plurality of metrics associated with the network of computing devices.

17. The apparatus of claim 15, wherein one of the plurality of performance attributes comprises Central Processing Unit (CPU) utilization.

18. The apparatus of claim 15, wherein the alert condition indicates that a metric has exceeded a predetermined threshold.

19. The method of claim 1, wherein monitoring the plurality of composite indicators comprises monitoring a Boolean combination of the plurality of composite indicators.

20. The apparatus of claim 6, wherein the processor is configured to monitor the plurality of composite indicators by monitoring a Boolean combination of the plurality of composite indicators.

* * * * *